(12) United States Patent
Chen et al.

(10) Patent No.: US 10,482,655 B2
(45) Date of Patent: Nov. 19, 2019

(54) METHOD AND APPARATUS FOR PROVIDING A TILE-BASED DIGITAL ELEVATION MODEL

(71) Applicant: HERE GLOBAL B.V., Eindhoven (NL)

(72) Inventors: Xin Chen, Evanston, IL (US); Andi Zang, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 18 days.

(21) Appl. No.: 15/818,159

(22) Filed: Nov. 20, 2017

(65) Prior Publication Data

US 2019/0156566 A1   May 23, 2019

(51) Int. Cl.
| | |
|---|---|
| *G06T 17/05* | (2011.01) |
| *G06N 7/00* | (2006.01) |
| *G06T 19/20* | (2011.01) |
| *G06T 3/40* | (2006.01) |
| *G09B 29/12* | (2006.01) |
| *G09B 29/10* | (2006.01) |
| *G01S 17/89* | (2006.01) |
| *G01C 21/32* | (2006.01) |
| *G01C 11/06* | (2006.01) |

(52) U.S. Cl.
CPC ............ *G06T 17/05* (2013.01); *G06N 7/005* (2013.01); *G06T 3/40* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 7,194,389 B2 | 3/2007 | Damron | |
| 8,340,360 B2 | 12/2012 | Chen et al. | |
| 8,958,980 B2 | 2/2015 | Miksa et al. | |
| 2003/0143523 A1* | 7/2003 | Kato | B01J 19/0046 435/4 |
| 2003/0154060 A1* | 8/2003 | Damron | G06F 17/10 703/2 |

(Continued)

OTHER PUBLICATIONS

Z. M. Moratto et al., "The Ames Stereo Pipeline: NASA's Open Source Automated Stereogrammetry Software", A part of the NASA NeoGeography Toolkit, Version 2.6.0, Nov. 19, 2017, retrieved from https://byss.arc.nasa.gov/stereopipeline/daily_build/asp_book.pdf, 211 pages.

(Continued)

*Primary Examiner* — Yingchun He
(74) *Attorney, Agent, or Firm* — Ditthavong & Steiner, P.C.

(57) ABSTRACT

An approach is provided for providing a digital elevation model. For example, the approach involves processing, by a processor, map elevation data to create a hierarchical resolution tile representation of the digital elevation model for a geographic area. The hierarchical resolution tile representation includes a plurality of resolution levels, wherein each of the plurality of levels represents the digital elevation model at a different resolution. The digital elevation model includes a plurality of control points, wherein each of the plurality of control points is associated with an elevation data point determined from the map elevation data.

18 Claims, 16 Drawing Sheets

LOCAL DEM 621

PROBABILITY MAP 623

(56) References Cited

U.S. PATENT DOCUMENTS

| | | | |
|---|---|---|---|
| 2006/0074958 A1 | 4/2006 | Biacs | |
| 2010/0118053 A1* | 5/2010 | Karp | G01C 11/06 |
| | | | 345/630 |
| 2016/0057920 A1* | 3/2016 | Spiller | A01B 69/008 |
| | | | 701/23 |
| 2017/0039765 A1* | 2/2017 | Zhou | G06T 19/006 |

OTHER PUBLICATIONS

European Office Action for related European Patent Application No. 18207097.9-1003, dated Apr. 8, 2019, 9 pages.

Zang et al., "High-Definition Digital Elevation Model System Vision Paper", retrieved on Apr. 15, 2019, from http://cake.fiu.edu/Publications/Zang+al-17-HD_High-Definition_Digital_Elevation_Model_System_ACM_downloaded.pdf, 6 pages.

* cited by examiner

METHOD AND APPARATUS FOR PROVIDING A TILE-BASED DIGITAL ELEVATION MODEL

BACKGROUND

Mapping-related service providers (e.g., map data providers, navigation service providers, etc.) face significant technical challenges when generating map data at detail or resolution levels required by end user services and applications. For example, elevation data for terrains or surfaces (e.g., road surfaces) of interest is an example of a type of map data that is being increasingly used in a wide range of services and applications (e.g., autonomous driving, weather modeling, etc.). However, each of these services and applications may have different resolution or detail requirements (e.g., centimeter-level accuracy for autonomous driving versus meter-level accuracy for weather modeling). Accordingly, with respect to elevation data, service providers face challenges to providing an efficient and high-quality digital elevation model (DEM) that can scale to different resolutions based on the requirements of a service or application.

SOME EXAMPLE EMBODIMENTS

Therefore, there is a need for an approach for generating a hierarchical tile-based digital elevation model.

According to one embodiment, a method comprises processing map elevation data to create a hierarchical resolution tile representation of the digital elevation model for a geographic area. The hierarchical resolution tile representation includes a plurality of resolution levels, and each of the plurality of levels represents the digital elevation model at a different resolution. The digital elevation model includes a plurality of control points, and each of the plurality of control points is associated with an elevation data point determined from the map elevation data. In one embodiment, the method further comprises, for a tile at one level of the plurality of resolution levels, creating a local digital elevation model by projecting the map elevation data for the tile to a tangent plane comprising a plurality of elevation data points. The method further comprises computing a probability map for the plurality of elevation data points, the probability map indicating respective probability data that each of the plurality of elevation data points is associated with a corresponding elevation value. The method further comprises interpolating one or more of the plurality of elevation data points based on the probability map to create an interpolated local digital elevation model.

According to another embodiment, an apparatus comprises at least one processor, and at least one memory including computer program code for one or more computer programs, the at least one memory and the computer program code configured to, with the at least one processor, cause, at least in part, the apparatus to process map elevation data to create a hierarchical resolution tile representation of the digital elevation model for a geographic area. The hierarchical resolution tile representation includes a plurality of resolution levels, and each of the plurality of levels represents the digital elevation model at a different resolution. The digital elevation model includes a plurality of control points, and each of the plurality of control points is associated with an elevation data point determined from the map elevation data. In one embodiment, the apparatus is further caused to, for a tile at one level of the plurality of resolution levels, create a local digital elevation model by projecting the map elevation data for the tile to a tangent plane comprising a plurality of elevation data points. The apparatus is further caused to compute a probability map for the plurality of elevation data points, the probability map indicating respective probability data that each of the plurality of elevation data points is associated with a corresponding elevation value. The apparatus is further caused to interpolate one or more of the plurality of elevation data points based on the probability map to create an interpolated local digital elevation model.

According to another embodiment, a non-transitory computer-readable storage medium carries one or more sequences of one or more instructions which, when executed by one or more processors, cause, at least in part, an apparatus to process map elevation data to create a hierarchical resolution tile representation of the digital elevation model for a geographic area. The hierarchical resolution tile representation includes a plurality of resolution levels, and each of the plurality of levels represents the digital elevation model at a different resolution. The digital elevation model includes a plurality of control points, and each of the plurality of control points is associated with an elevation data point determined from the map elevation data. In one embodiment, the apparatus is further caused to, for a tile at one level of the plurality of resolution levels, create a local digital elevation model by projecting the map elevation data for the tile to a tangent plane comprising a plurality of elevation data points. The apparatus is further caused to compute a probability map for the plurality of elevation data points, the probability map indicating respective probability data that each of the plurality of elevation data points is associated with a corresponding elevation value. The apparatus is further caused to interpolate one or more of the plurality of elevation data points based on the probability map to create an interpolated local digital elevation model.

According to another embodiment, an apparatus comprises means for processing map elevation data to create a hierarchical resolution tile representation of the digital elevation model for a geographic area. The hierarchical resolution tile representation includes a plurality of resolution levels, and each of the plurality of levels represents the digital elevation model at a different resolution. The digital elevation model includes a plurality of control points, and each of the plurality of control points is associated with an elevation data point determined from the map elevation data. In one embodiment, the apparatus further comprises means for, for a tile at one level of the plurality of resolution levels, creating a local digital elevation model by projecting the map elevation data for the tile to a tangent plane comprising a plurality of elevation data points. The apparatus further comprises means for computing a probability map for the plurality of elevation data points, the probability map indicating respective probability data that each of the plurality of elevation data points is associated with a corresponding elevation value. The apparatus further comprises means for interpolating one or more of the plurality of elevation data points based on the probability map to create an interpolated local digital elevation model.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a tile-based digital elevation model (DEM) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
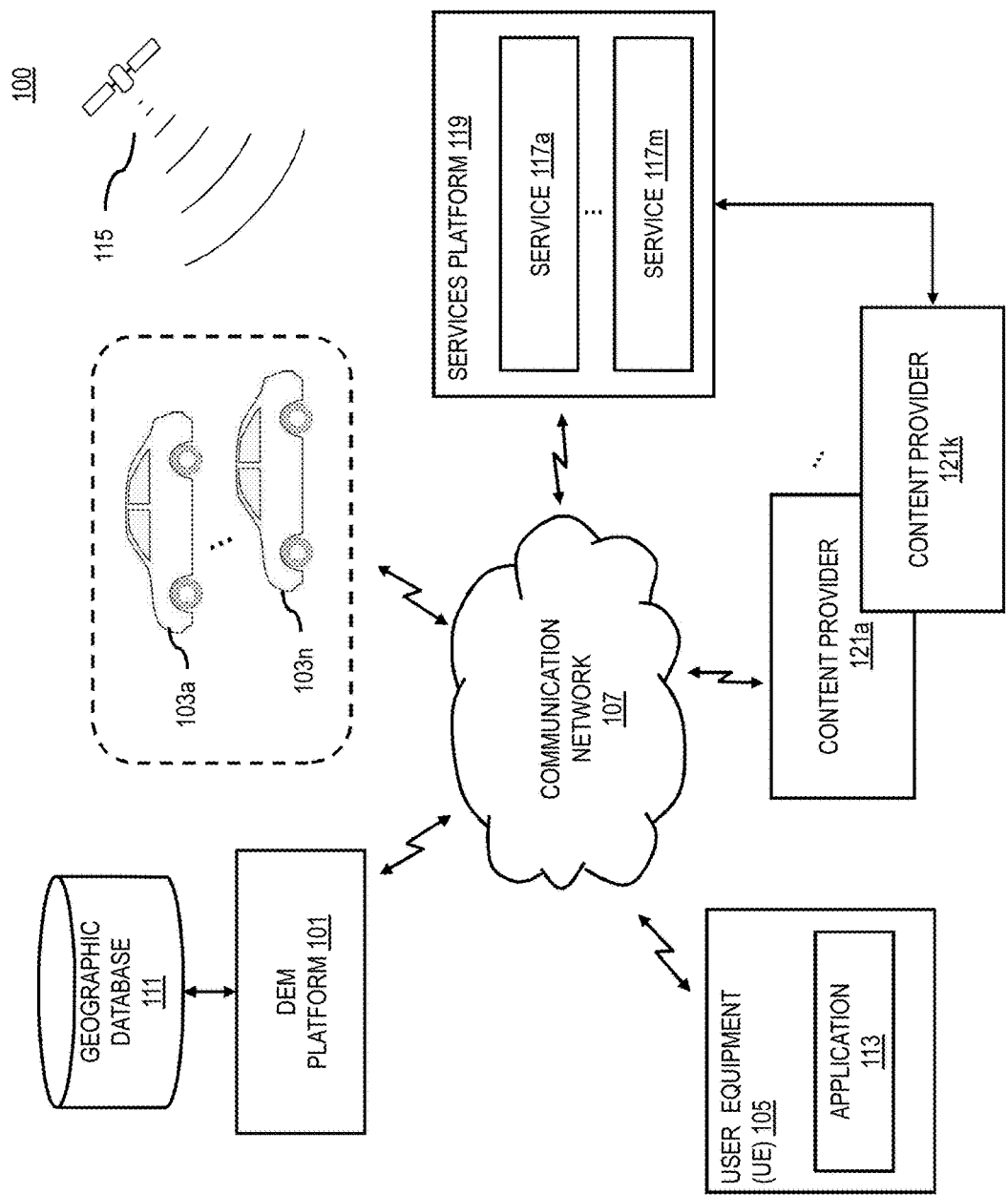
FIG. 1 is a diagram of a system capable of providing a tile-based digital elevation model, according to one embodiment.

FIG. 1 is a diagram of a system capable of providing a tile-based DEM, according to one embodiment. Digital Elevation Modeling (DEM) has been a widely used methodology in plethora of application domains, ranging from climate and geological studies, through temporal evolution of various migration patterns, to Geographic Information Systems (GIS) broadly. However, traditional DEM methodologies and systems cannot quite straightforwardly be extended to catch up with the demands due to recent developments in autonomous driving, vehicle localization, drone and dynamically evolving high-definition smart city modeling. The new challenges are the demand of higher precision, sparse(r) elevation data compression, real-time efficient retrieval, and intra-sources data integration. In other words, traditional DEM systems generally are technically lacking in the areas of integration or update of elevation data from different resources into the DEM, DEM generation from high definition (HD) sources such as point cloud data, and fast retrieval of elevation data.

Figure 2:
FIG. 2 is a diagram illustrating example differences in elevation data based on elevation correction, according to one embodiment.

For example, to represent elevation data, traditional map data editors and automation algorithms typically simply project detected terrain features (e.g., geographic features determined from point cloud data, aerial/perspective images, etc.) to a local tangent plane to reduce either the difficulty of editing the resulting map data, or the cost of computation. However, this traditional approach will cause all the control points of local map representation of the geographic area of interest to be located at the same elevation. This, in turn, results in map data with elevation values missing (e.g., referred to in the art as "elevation missing") or having elevation values that are generalized to the same value over the entire area. This missing elevation data can be problematic. For example, some mountain roads have more than one-meter elevation differential between its left and right most lane. FIG. 2 illustrates an example of such a mountain road 201 in which the traditionally determined road model 203 (e.g., depicted as solid lines) can be substantially different from their positions corrected for elevation to generated elevation corrected road models 205 (e.g., depicted as dotted lines). When consecutive road segments with elevation missing are rendered, the resulting map display can show an abrupt jump, causing a "stair-case" effect, where there is not a smooth transition from one elevation of a road segment to the next elevation of the adjacent road segment.

In addition, traditional DEMs are aimed at providing a digital representation that reflects three-dimensional features (e.g., the elevation of a particular terrain or surface) for traditional tasks such as land surveying, climate and geological studies, GIS, etc. However, these traditional tasks generally do not demand stringent response times unlike new tasks such as autonomous driving which can require quick response times for retrieving elevation data to support real-time operation of an autonomous vehicle. In addition, the querying capabilities of traditional DEMs can be limited—e.g., a typical interaction would involve defining a (rectangular) clipping area and dragging it to the location of interest to retrieve elevation data for the area of interest.

Based on the technical challenges discussed above (e.g., HD DEM generation, DEM integration between different elevation data sources, and DEM data retrieval time), the system 100 of FIG. 1 introduces a capability to provide a hierarchical resolution tile-based DEM that includes different resolution levels. In one embodiment, the elevation data to populate the different resolutions levels can be retrieved from difference elevation data sources depending on the corresponding resolution of the level. By way of example, the resolution levels of the tile-based DEM can be specified according to any process. One example system includes, but is not limited to, specifying resolutions based on increasing levels with level 1 being the lowest resolution level. Under this example hierarchy, the lowest detail or resolution level (e.g., level 0), the map can be represented by a fixed resolution (e.g., 512×512 pixels). Then at each increasing resolution level, the map resolution is doubled so that the resolution at level 1 increases to 1024×1024, the resolution at level 2 increases to 2048, and so on. When the map is a fixed size (e.g., the surface of the Earth), each pixel at each increasing successive level will correspond to a smaller geographic area or ground resolution. For example, for a whole Earth map at level 0, the ground resolution is approximately 78 million meters per pixel, and at level 22, the ground resolution is approximately 0.02 meters per pixel. In one embodiment, each pixel can also be referred to as a tile in the tile-based DEM.

Figure 3A:
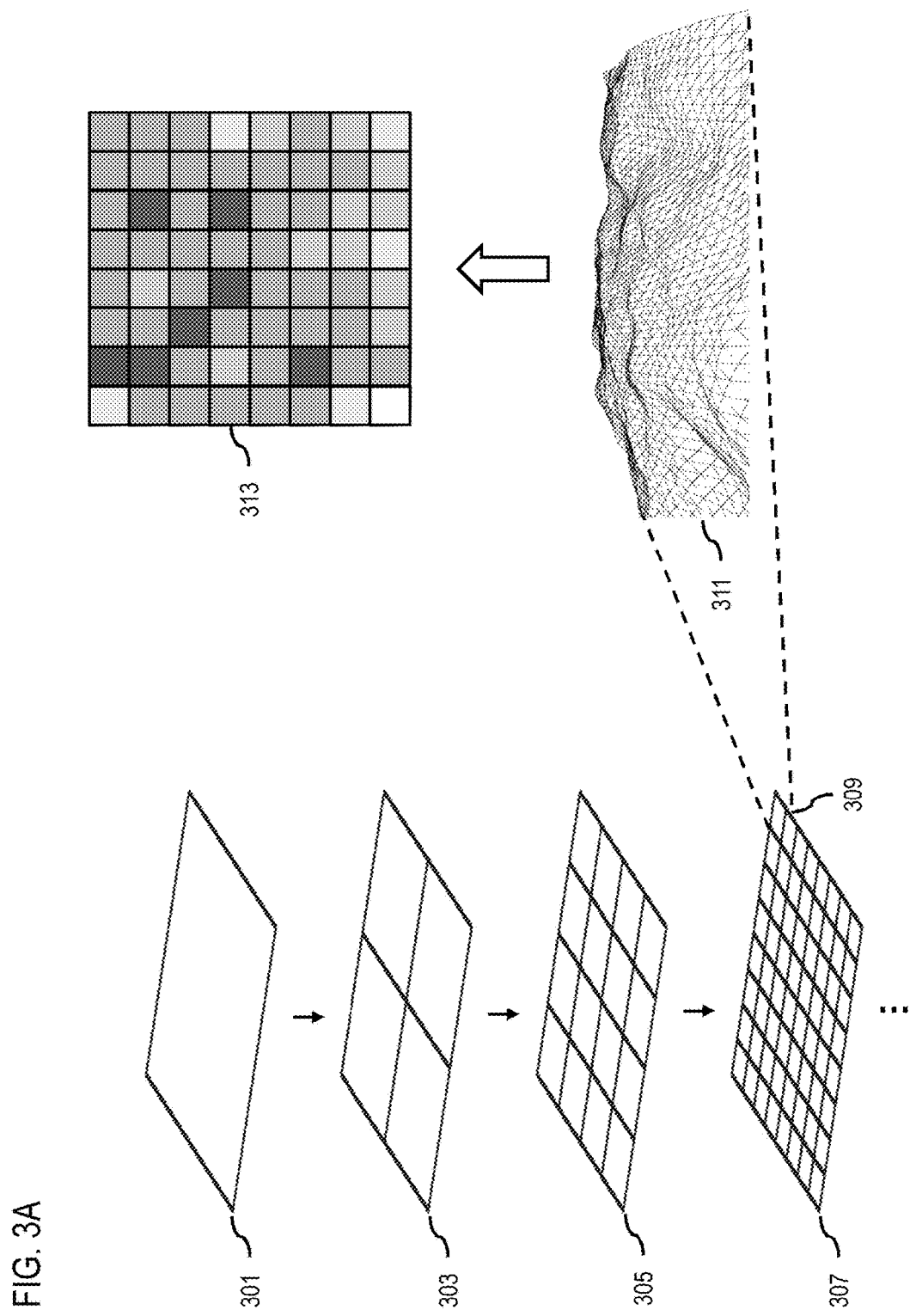
FIGS. 3A and 3B are diagrams illustrating a hierarchical tile-based digital elevation model, according to one embodiment.

FIG. 3A illustrates an example hierarchical tile-based DEM, according to one embodiment. As shown, a tile 301 corresponds to elevation data at a level 0. Map tiles 303 are four tiles at level 1 providing higher resolution elevation data corresponding to the same geographic area covered by the tile 301. At the next level 2, map tiles 305 are 16 tiles providing higher resolution elevation data corresponding to the same geographic area as tile 301. At the next level 3, map tiles 307 are 64 tiles providing yet higher resolution elevation data corresponding to the same geographic area as tile. The resolution levels can continue to increase, but in one embodiment, the system 100 can stop at level 22 or 23 where each pixel or tile corresponds to a centimeter or below. In one embodiment, each tile can represent a local DEM corresponding to the its ground area. For example, a map 309 at level 3 corresponds to the elevation data of a terrain or surface 311. In one embodiment, the elevation data of surface 311 is represented by a local DEM of the tile 309 using a 2D representation 313 of the 3D elevation data. In this case, each pixel of the of 2D representation can be a shaded to correspond to an elevation data value based on the 3D surface 311.

In one embodiment, each resolution level can be based on different sources of elevation data as inputs for generating the DEM at the corresponding resolution for the level. For example, for relatively low resolutions levels (e.g., levels 0-16), the system 100 can use low resolution elevation data available from sources such as U.S. Geological Survey (USGS), National Oceanic and Atmospheric Administration (NOAA), and/or other public datasets. For higher resolution levels (e.g., 17-22) and/or urban/road regions, the system 100 can use point cloud data (e.g., LiDAR data) to generate an HD DEM for the tiles at the higher resolutions. In one embodiment, the system 100 collects the DEM of the different sources into the hierarchical tile-based DEM data structure. In one embodiment, the system 100 can also align the DEM of different sources at the same resolution level or across different resolution levels. In this way, each time an elevation query is received (e.g., querying by single point or bounding box, and specifying a desired resolution level), the system 100 will return the elevation value or elevation map respectively.

Figure 3B:
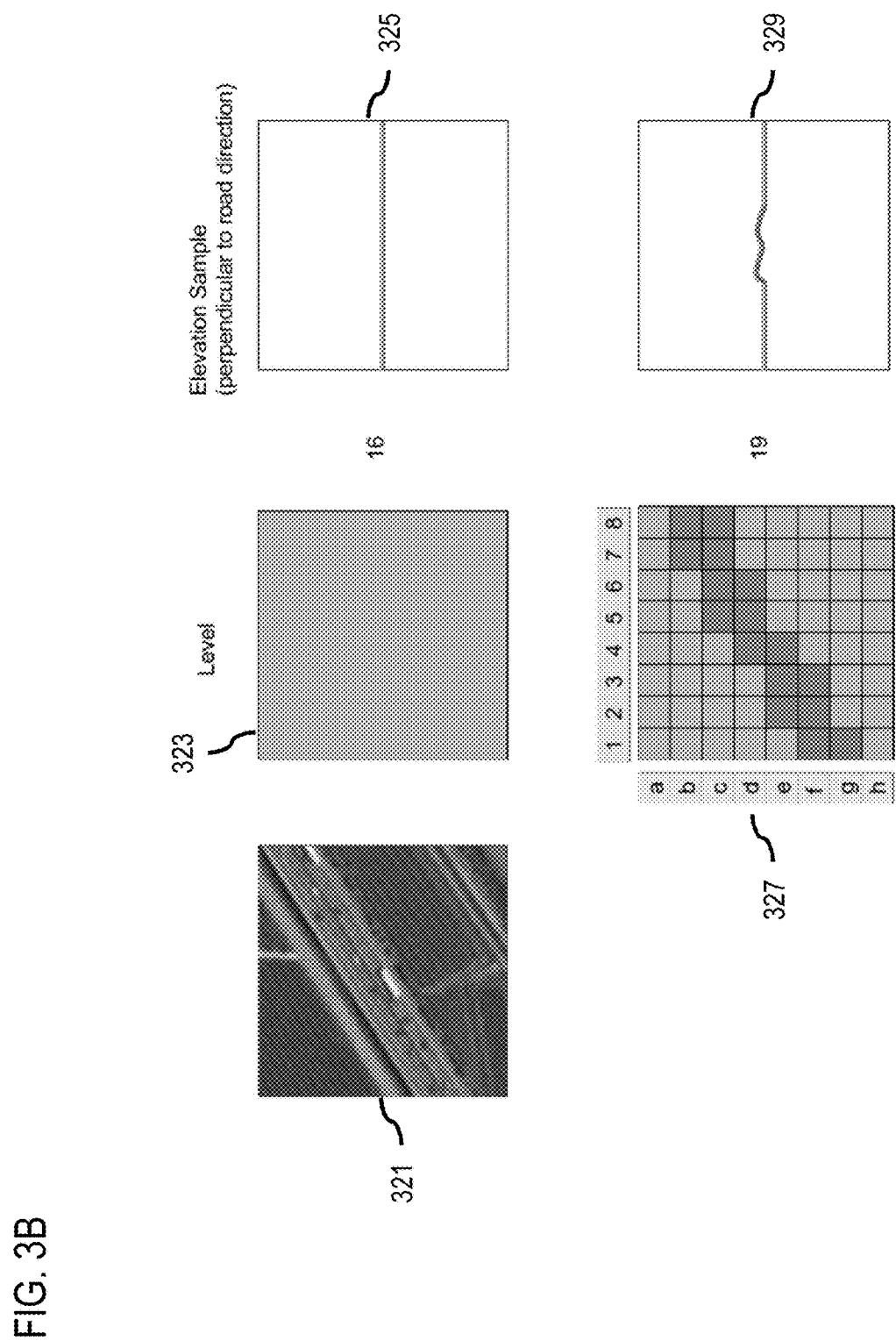

For example, as shown in FIG. 3B, the system 100 receives an elevation query specifying a location (e.g., location (d, 4)) within a mapped area 321. If the query requests the elevation data at resolution level 16, the output would be an elevation output 323 generalized to the entire tile encompassing location (d, 4) at resolution level 16. In this example, at resolution 16, the elevation output 323 makes it appear as if the entire area is one elevation as shown in cross section 325 (e.g., elevation perpendicular to the direction of the road present in the mapped area 321). However, if the query specifies the elevation data at resolution level 19, the resulting elevation output 327 will indicated that location (d, 4) is slightly elevated with respect to the other locations in the mapped area 321, as shown in the cross-section 329. By providing a tile-based DEM that includes multiple resolution levels within on data structure, the system 100 enables flexible retrieval and quick retrieval of elevation data at appropriate resolutions levels without having to separately query different data sources as would be done traditionally. For example, without the hierarchical tile-based DEM, the system 100 would have to retrieve elevation data for location (d, 4) at level 16 from a low-resolution database such as from USGS or NOAA. Then if the system 100 would have to separately retrieve the same location at level 19 from a separate data source (e.g., from LiDAR point cloud source). This can result in having to perform multiple queries and retrievals, thereby wasting resources and increasing response times versus querying the hierarchical tile-based DEM. Therefore, by using the hierarchical tile-based DEM, the system 100 advantageously reduces resources and improves query response times for elevation queries.

As shown in FIG. 1, a system 100 includes a DEM platform 101 configured to provide, for instance, collection, processing, and/or distribution of hierarchical tile-based DEM data according to the various embodiments described.

In one embodiment, the DEM platform 101 can also act as a general mapping platform to provide any other type of geographical or map data (e.g., traffic incident reports, location-based events, weather data, and/or any other reports of geotagged data) using the embodiment of the hierarchical tile-based approaches described herein. In one embodiment, the DEM platform 101 is part of a digital transportation infrastructure that provides for delivery of information (e.g., DEM-related data) from and to connected vehicles 103a-103n (also collectively referred to as vehicles 103) and/or other connected devices (e.g., user equipment (UE) 105) over a communication network 107. In one embodiment, as part of creating this digital transportation infrastructure, the DEM platform 101 receives and delivers geographical data such as DEM data to support services and applications such as autonomous driving for the vehicles 103. Although various embodiments are discussed with respect to DEM data organized into a tile-based hierarchical data structure that is stored, for instance, in a geographic database 111, it is contemplated that any other type of geographical data that includes or is tagged with location data (e.g., geographical coordinates) of the geographic database 111 is applicable to the various embodiments described herein.

Figure 4:
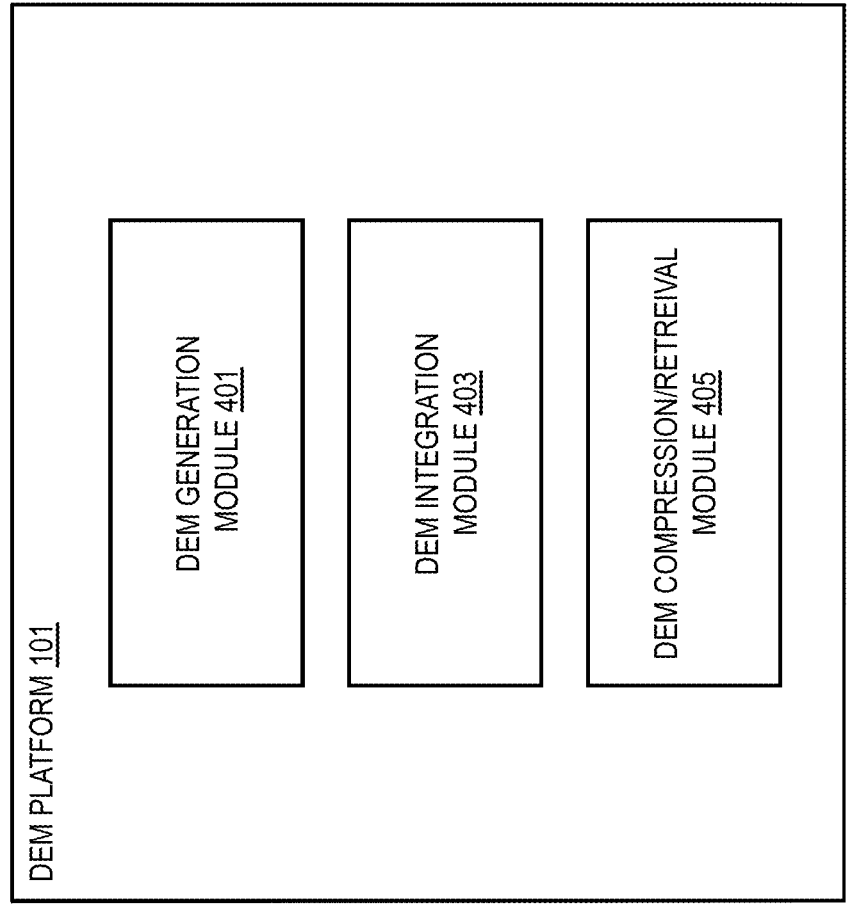
FIG. 4 is a diagram of the components of a digital elevation model platform, according to one embodiment.

FIG. 4 is a diagram of the components of the DEM platform, according to one embodiment. By way of example, the DEM platform 101 includes one or more components for providing a hierarchical tile-based DEM according to the various embodiments described herein. It is contemplated that the functions of these components may be combined or performed by other components of equivalent functionality. In one embodiment, the DEM platform 101 includes a DEM generation module 401, a DEM integration module 403, and a DEM compression/retrieval module 405. The above presented modules and components of the DEM platform 101 can be implemented in hardware, firmware, software, or a combination thereof. Though depicted as a separate entity in FIG. 1, it is contemplated that the DEM platform 101 may be implemented as a module of any of the components of the system 100 (e.g., a component of the services platform 119, the services 117a-117m of the services platform, the vehicles 103, UEs 105, etc.). In another embodiment, one or more of the modules 401-405 may be implemented as a cloud based service, local service, native application, or combination thereof. The functions of the DEM platform 101 and the modules 401-405 are discussed with respect to FIGS. 5-8 below.

Figure 5:
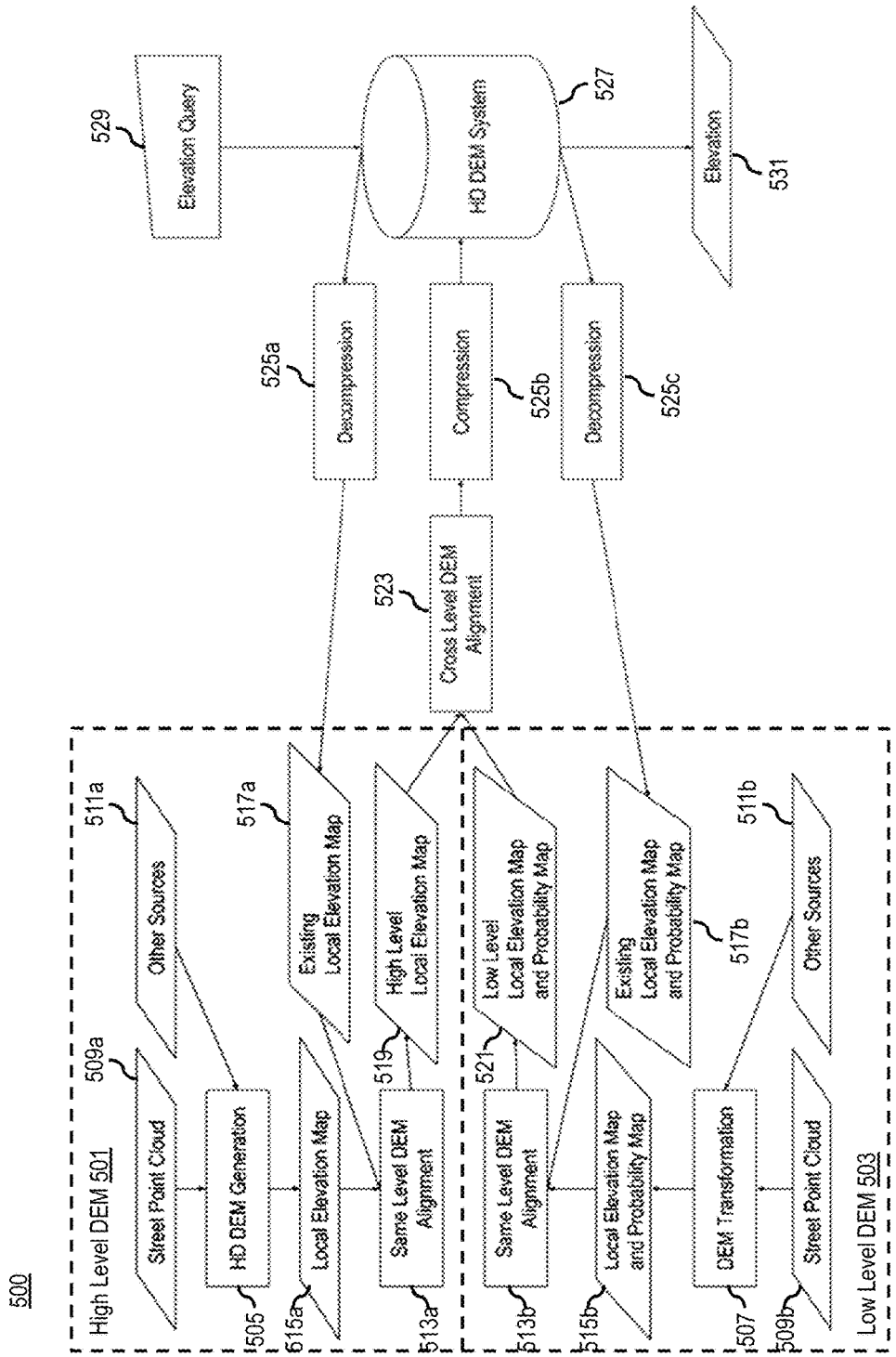
FIG. 5 is a flowchart of a process for providing a tile-based digital elevation model, according to one embodiment.
Figure 11:
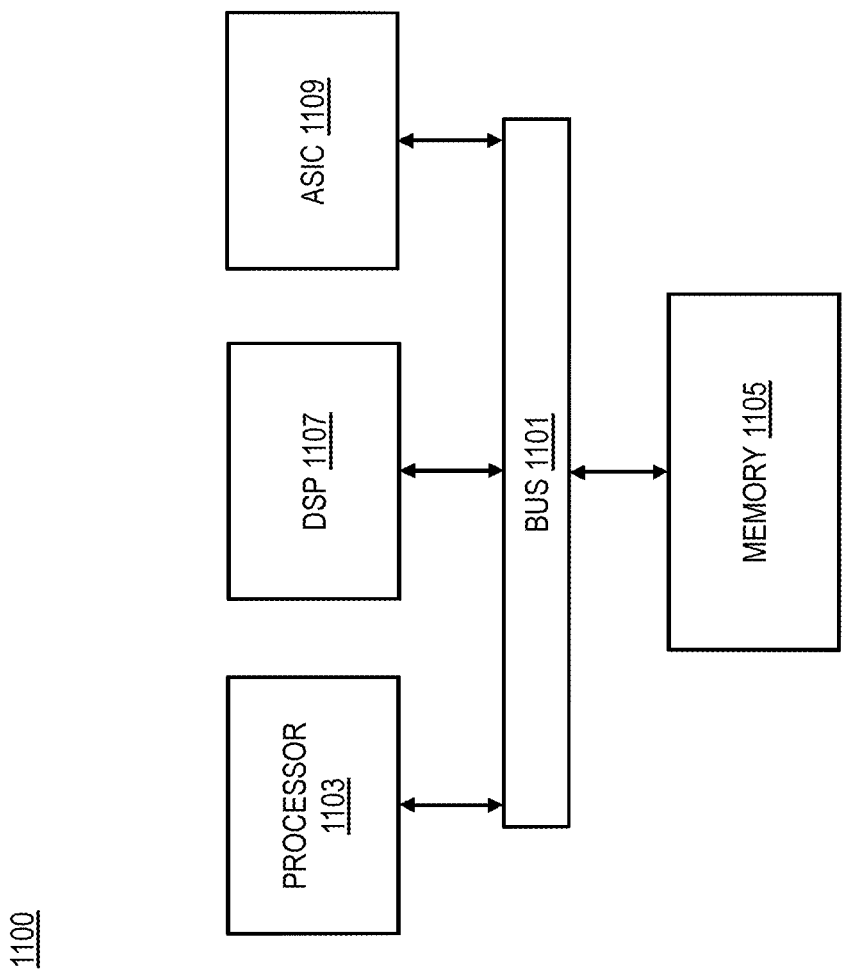
FIG. 11 is a diagram of a chip set that can be used to implement an embodiment of the invention.

FIG. 5 is a flowchart of a process for providing a tile-based digital elevation model, according to one embodiment. In various embodiments, the DEM platform 101 and/or any of the modules 401-405 of the DEM platform 101 as shown in FIG. 4 may perform one or more portions of the process 500 and may be implemented in, for instance, a chip set including a processor and a memory as shown in FIG. 11. As such, the DEM platform 101 and/or the modules 401-405 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

As described above, in one embodiment, the DEM platform 101 can ingest elevation data from a variety of sources of different resolution levels to create the hierarchical tile-based DEM. In other words, the DEM platform 101 processes map elevation data to create a hierarchical resolution tile representation of the digital elevation model for a geographic area. The hierarchical resolution tile representation includes a plurality of resolution levels, each of the plurality of levels representing the digital elevation model at a different resolution. In addition, the digital elevation model includes a plurality of control points (e.g., pixels, location points, etc.), each of the plurality of control points being associated with an elevation data point determined from the map elevation data.

In one embodiment, the elevation data sources for creating the tile-based DEM generally can be divided into low-resolution sources which do not use point cloud data to generate elevation data points, and high-resolution sources which do use point cloud data (e.g., LiDAR data) to generate elevation data. For example, at low resolutions (e.g., in the ten-meter-level category), most providers or sources—for example, U.S. Geological Survey (USGS) and Earth Remote Sensing Data Analysis Center (ERDAC), National Oceanic and Atmospheric Administration (NOAA)—use flying platforms such as remote sensing satellites and airborne laser scanner to survey a large area (e.g., from a county-wide level to a country-wide level). However, these approaches typically yield low data precision and exhibit higher measurement errors. The advantage of low-resolution DEM data (e.g., ten-meter-level DEM data) is availability and coverage (e.g., many public sources or low-resolution elevation data cover the entire world).

In the high-resolution category (e.g., meter-level resolution or better), the elevation data is acquired with a much higher precision. However, high-resolution elevation data is typically more limited in coverage. For example, such high-resolution data usually cover a smaller geographic region, and/or associated with areas of a specific phenomenon (e.g., pollution, micro-climate variability), which covers the most cities worldwide but may not cover more rural or remote areas. On the highest resolution-end, the DEM data can be generated from ground-based LiDAR. For example, compared to airborne-based data (e.g., satellite imaging, remote sensing, or even drone-based LiDAR), ground-based LiDAR has the advantage of a much higher precision. However, it generally suffers from much smaller coverage and higher acquisitions costs. Generally, ground-based LiDAR sources have the highest demand in autonomous driving applications.

Accordingly, in one embodiment, the process 500 is separated into a high-level DEM process 501 for generating DEM data for high resolution levels (e.g., levels 17-22 or greater), and a low-level DEM process 503 for generating DEM data for lower resolution levels (e.g., levels 0-16) to create the hierarchical tile-based DEM according to the various embodiments described herein. By way of example, the high-level DEM process 501 and the low-level DEM process 503 are similar with the exception that the high-level DEM process 501 includes an DEM generation process 505 (e.g., HD DEM generation) in place of an DEM transformation process 507 in the low-level DEM process 503. The DEM generation process 505 involves generating an elevation map of an area of interest from raw sensor data (e.g., LiDAR point cloud data). In comparison, the DEM transformation process 507 involves converting or transforming an existing elevation map to meet the requirements for a corresponding resolution level of the hierarchical tile-based DEM. This is because, as noted above, there generally already exists resolution elevation map data from a variety of public sources (e.g., USGS, NOAA, etc.), and therefore, new sensor data to generate low resolution elevation generally is not required. However, if no such existing elevation map data is available, the low-level DEM process 503 can also employ the DEM generation process 505 to generate low resolution elevation map data from raw sensor data (e.g., satellite/aerial imagery, aerial-based LiDAR, etc.).

At process 505 of the high-level DEM process 501, the DEM generation module 401 initiates an HD DEM generation process by retrieving street point cloud data 509*a* (e.g., ground-based LiDAR data) and/or equivalent other sources 511*a* of high resolution elevation data or related information. Historically, HD DEM generation from point cloud has been the most popular method for having a high-level elevation model. Traditional HD DEM methods are generally straightforward. For example, given a known vehicle location, the traditional HD DEM finds the vehicle's foot print by vehicle configuration (e.g., sensor location in a vehicle-centric coordinate system). A surface region grows from this foot print until some restrictions are reached (e.g., local plane normal differential, number of points in local plane, etc.). This traditional method is more like a "road surface detection" method which only can generate local surface or elevation data from a single drive. Under this traditional approach, the elevation information also needs to be assigned to control points when the HD map automation is run on the fly to generate the elevation data, thereby making the computation on road surface "disposable", not reusable. Also, since the road surface is local of local—e.g., traditional approaches only care about the surface where vehicle drove on (one side of road), and no global correlation is preformed between other surfaces, it can difficult to align the elevation maps from different sources (e.g., from different cross drives) because they are several isolated pieces of the surface in same region.

With respect to the DEM transformation process 507 of the low-level DEM process 503, the DEM generation module 401 can also potentially face issues of lack of global coordinate reference or correlation between different sources or sets of the low-resolution map data. As shown, the low-resolution map and/or sensor data can be retrieved from street point cloud data 509*b* (e.g., lower-resolution aerial LiDAR point cloud data) and/or other low-resolution elevation data sources 511*b*, each with potentially elevation data localized to a local reference point (e.g., a location of a data acquisition device, or other local coordinate), or otherwise have reference points recorded at resolutions that make correlating them to a global coordinate system imprecise.

To address this problem, in one embodiment, the DEM generation module 401 can perform data alignment processes using, for instance, both same-level alignment (e.g., same-level DEM alignment process 513*a* in the high-level DEM process 501, and same-level alignment process 513*b* of the low-level DEM process 503) and cross-level alignment (e.g., e.g., same-level DEM alignment process 513*a* in the high-level DEM process 501, and same-level alignment process 513*b* of the low-level DEM process 503) to align created and/or transformed elevation map to a global coordinate or reference system of the hierarchical tile-based DEM. For example, the DEM generation module 401 generates the HD DEM for high resolution levels of the hierarchical tile-based DEM by performing a same-level or cross-level alignment of the cross drives or point cloud sessions/observations recorded in ground-based LiDAR data obtained for a certain region or street segment. Similarly, the DEM generation module 401 perform a same-level or cross-level alignment of different low-resolution elevation data sets obtained from available data sets (e.g., USGS, NOAA, etc.).

In one embodiment, before aligning the data, the DEM generation module 401 can check for data sparsity in the retrieved elevation map or sensor data. Sparsity refers, for instance, to the data sets having at one or more pixels or location points with no elevation data or invalid elevation data (e.g., elevation data with probability below a threshold, outlier, etc.). Sparsity or lack of data can be particularly problematic in high-resolution data sets such as ground-based LiDAR point cloud data because of occlusions, limited coverage area, etc., which can be lead to no elevation data being collected for some pixels or locations.

In one embodiment, the DEM generation module 401 can identify the sparse pixels or locations, and then interpolate the elevation data for those pixels or locations. In other words, the DEM generation module 401 identifies a first set of the plurality of elevation data points of a DEM for which the respective probability data is above a threshold value, and a second set of the plurality of elevation data points for which there is no corresponding elevation value. The interpolated local digital elevation model is created by interpolating the map elevation data from the first set to the second set. For example, for each different data set (e.g., each drive or data acquisition session in one certain region of the high-resolution street point cloud data 509*a* or the low-resolution point cloud data 509*b*), the DEM generation module 401 generates an interpolated elevation map with a probability of each "location" or point in the elevation map having the specified elevation value (e.g., local elevation maps 515*a* and 515*b*, existing local elevation maps 517*a* and 517*b*, and their corresponding probability maps). Based on the interpolated map and computed probabilities, the DEM generation module 401 can then cross validate and register different elevation maps to generate a final high-level local elevation map 517 (e.g., a final HD DEM) and/or low-level local elevation map 521 as well as optional respective probability maps for a given resolution level of the hierarchical tile-based DEM.

Figure 6A:
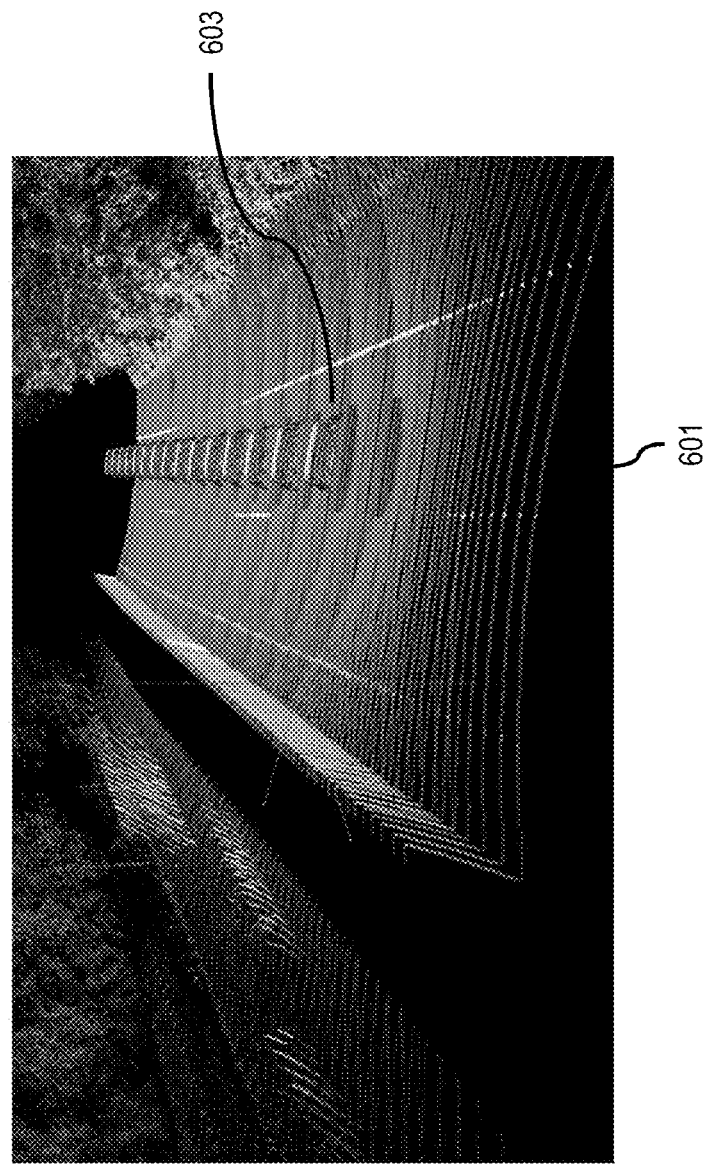
FIGS. 6A-6C are diagrams illustrating an example of interpolating elevation data points for tile based on a local digital elevation model and corresponding probability map, according to one embodiment.

FIG. 6A illustrates an example scenario for interpolating elevation data points for a road segment based on a probability map, according to one embodiment. In the scenario of FIG. 6A, a piece or segment of a two-way road 601 is depicted, in which the pavement surface of the road 601 is curvy and there are guardrails on boundaries of the road 601. More specifically, FIG. 6A depicts point cloud data of the road surface collected by an acquisition vehicle 603 equipped with a ground-based LiDAR sensor. As shown, the guardrail of the currently detected surface (e.g., detected from the point cloud data) also blocks some laser scan lines of the LiDAR so that some of the road surface on the farther side of the guardrail is blocked (e.g., shown as a dark area to the left of the guardrail). In one embodiment, given the road 601 and the available point cloud data, the DEM generation module 401 creates a local elevation map of the segment of the road 601 and identifies the portions of the local elevation map corresponding to surface of the road 601, other road-like surfaces, and/or any other related surfaces. The DEM generation module 401 then computes a probability map corresponding to the same geographic area covered by the local elevation map. In one embodiment, the probability map is created by computing respective probabilities for each "pixel", tile, or location point of the local DEM or elevation map, where the probabilities represent the likelihood that each of the identified pixel, tile, location point, etc. of the road surface in probability map has the elevation value determined from the corresponding point cloud data and/or other elevation data source.

Figure 6B:
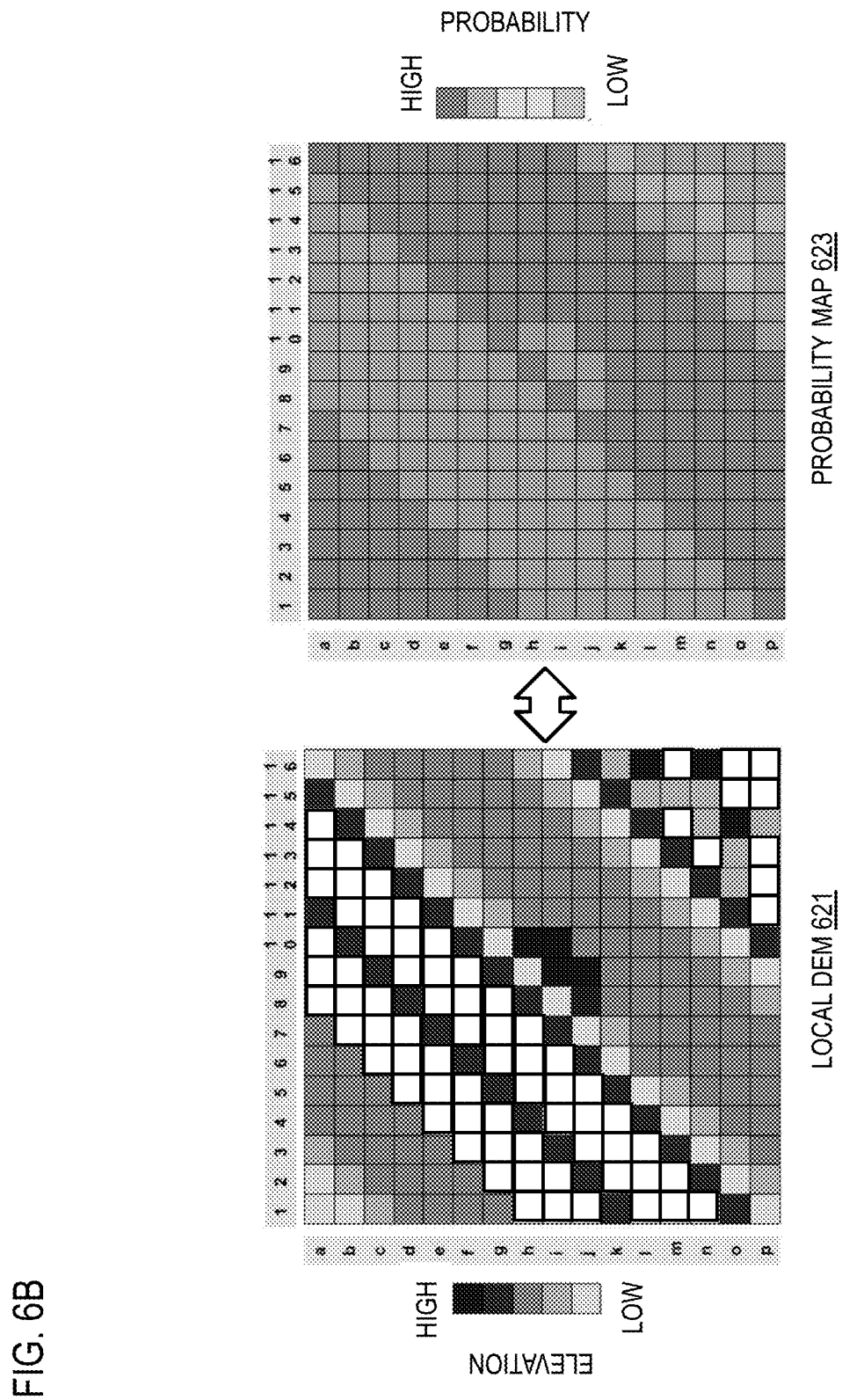

FIG. 6B illustrates examples of a local elevation map 621 and its corresponding probability map 623 created according to the various embodiments described herein. In one embodiment, the DEM generation module 401 projects the determined elevation (e.g., determined from point cloud data) of each pixel into a local tangent plane to create the local DEM 621. In the visual representation of the local DEM 621 shown in FIG. 6B, pixels with no shading (e.g., colored white) indicate that the pixel does not have a determined elevation (e.g., the pixel is without any point hit on it). In this example, the probability map 623 represents the probabilities of the original or uninterpolated elevation values of the local DEM 621. In one embodiment, the probability map 623 is calculated based on normal direction variance, elevation differential, number of points in small local plant/region, and/or any other equivalent parameters.

In one embodiment, the DEM generation module 401 identifies the pixels in the local DEM 621 that have no elevation values (e.g., colored white) or invalid elevation values (e.g., elevation values with probabilities below a threshold value) as pixels that may need interpolation. The DEM generation module 401 then interpolates from the pixels with high probability elevation points (e.g., probabilities above a threshold value) to the pixels with no elevation values (e.g., areas where the LiDAR laser scans are blocked) or the pixels with elevation values with low probabilities. In one embodiment, the DEM generation module 401 can interpolate the elevation map of the local DEM 621 by using a triangulation method (e.g., Delaunay Triangulation) and/or any other equivalent process for geographical information system (GIS) interpolation. In one embodiment, the DEM generation module 401 can also optionally update the probability map 623 to reflect the interpolated map.

Figure 6C:
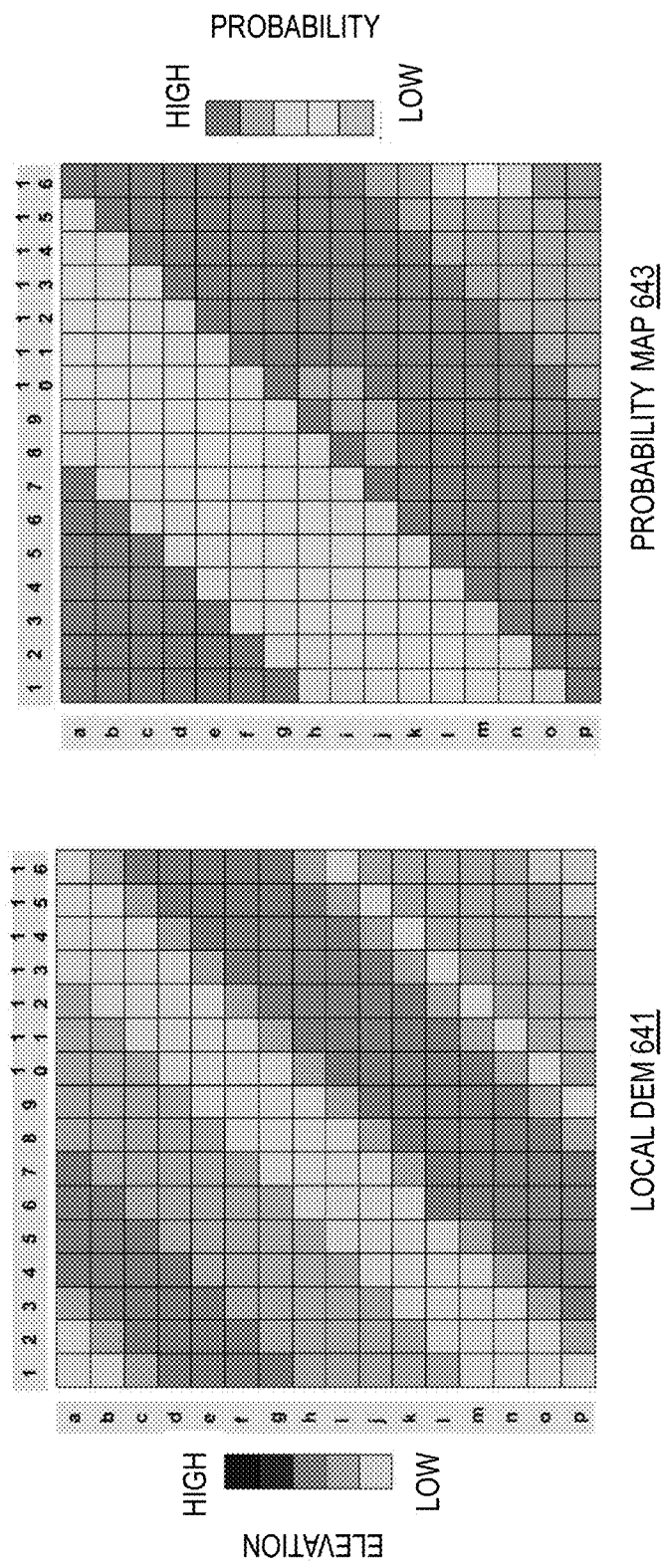

FIG. 6C continues the example of FIG. 6B and illustrates an interpolated local DEM 641 (e.g., interpolated elevation map) and corresponding updated probability map 643. As shown in the interpolated local DEM 641 of FIG. 6C, the pixels of the original local DEM 621 that had no elevation values (e.g., colored white) now have interpolated elevation values based on the high probability pixels of the local DEM 621. As shown, there is no pixel in the interpolated local DEM 641 that is colored white to indicate no corresponding elevation value. In addition, the DEM generation module 401 can optionally recompute the probabilities based on the interpolated elevation values to generate the updated probability map 643. In this example, the updated probability map 643 shows that the interpolated pixels of the interpolated local DEM 641 generally have lower probability values than uninterpolated pixels.

In one embodiment, after creating the interpolated local DEM 641, the DEM integration module 403 can proceed with initiating same-level DEM alignment (e.g., at the same-level alignment process 513a of the high-level DEM process 501 and/or same-level alignment process 513b of the low-level DEM process 503). Generally, same-level DEM alignment 513b at lower resolutions can be computationally less demanding than the case of aligning two DEM data sources with high resolution (e.g., same-level alignment process 513a). As discussed previously, a DEM or elevation map typically is represented as a 2D array of pixels, where each element of the array (i.e., a pixel) will have a specific value representing the determined elevation value for that pixel. By way of example, lower resolution DEMs are acquired for large area and, more often than not, they are continuous—in the sense that every pixel has a well-defined value. In other words, there is likely to be a "continuity" between neighboring pixels. When it comes to higher resolution DEM data, given the narrower area of sampling, it may be the case that the DEM array corresponding to a larger area may have pixels with undefined values.

In one embodiment, the same-level DEM alignment processes 513a and 513b transforms (at least one of) the two or more datasets that are to be aligned so that they are represented in a unified coordinate system values and/or boundaries, and then fuse the data from both sources at each unique pixel. It is contemplated that the DEM integration module 403 can use any process known in the art to perform the same-level DEM alignment processes 513a and 513. For example, the DEM integration module 403 can apply an Iterative Closest Points (ICP) matching algorithm for low resolution elevation map data.

However, on the high-resolution end, one may often end up with sparsity in the datasets as previously discussed. There are different causes for this sparsity—but a few example causes include, but are not limited to: object occlusion, LiDAR density, and other influencing factors (e.g., acquisition vehicle characteristics, sensor operational parameters, etc.). For example, operating an acquisition vehicle equipped with a ground-based LiDAR device at a higher speed will result in a higher speed of motion of the LiDAR device. This higher speed of motion, in turn, will result in a sparser point cloud data set. Thus, the classic ICP approach may not be suitable for this task.

Figure 7A:
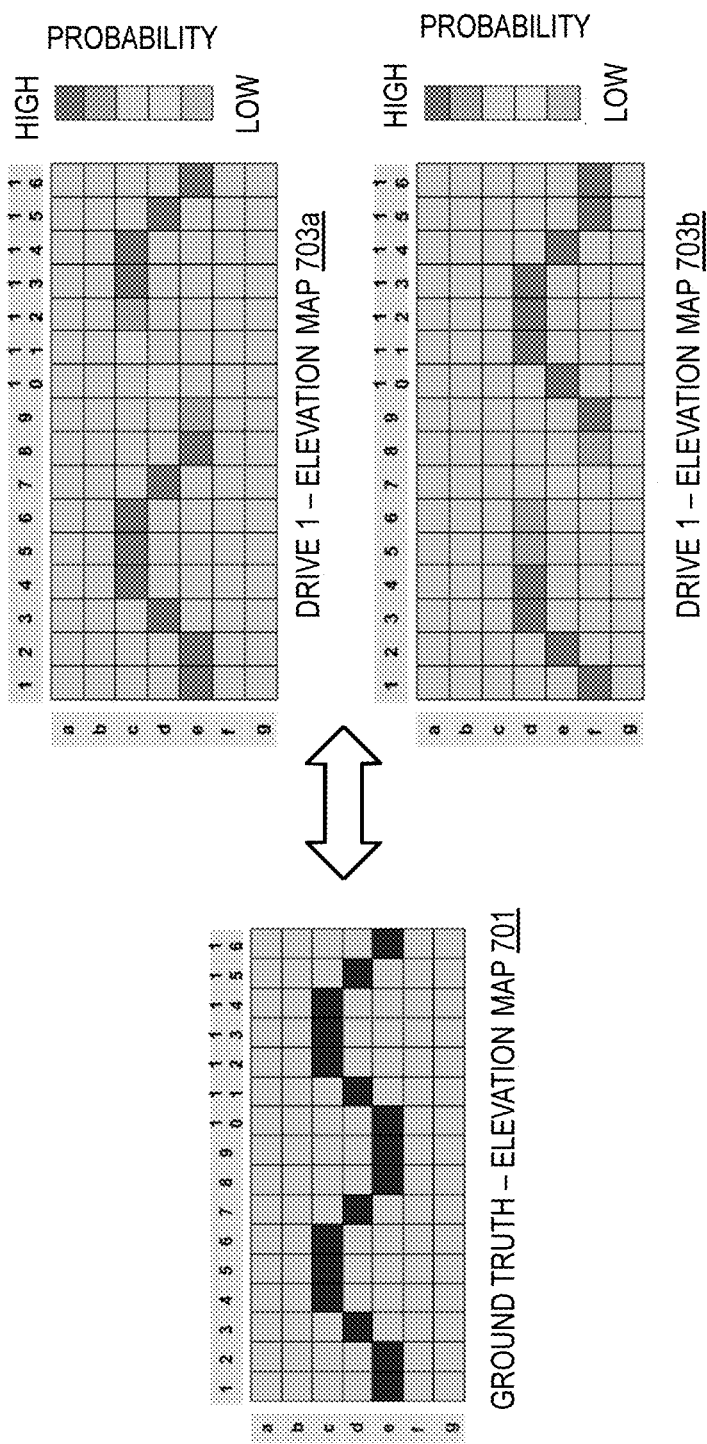
FIGS. 7A and 7B are diagrams illustrating an example of a same-level alignment for a tile-based digital elevation model, according to one embodiment.
Figure 7B:
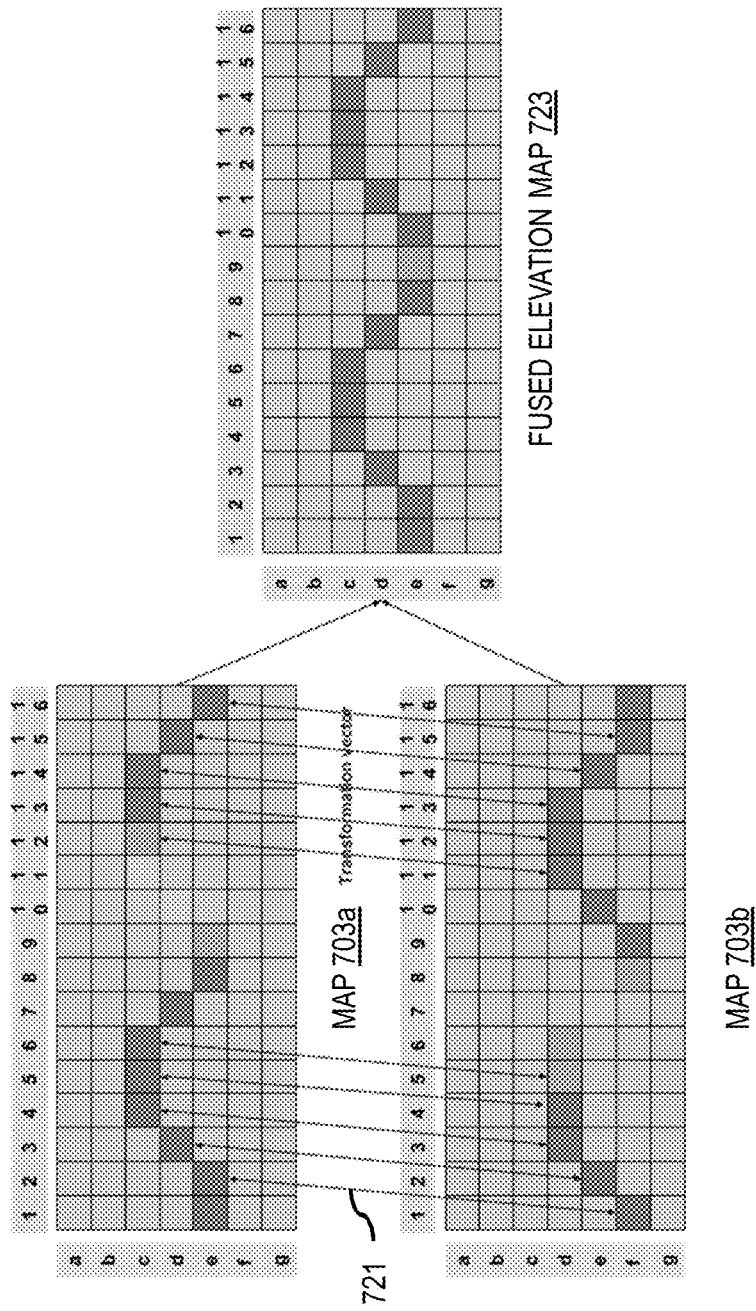

To address this problem, the DEM integration module 403 introduces a capability to use a "weighted" ICP approach. In one embodiment, the weighted ICP approach determines, for instance, the weight to apply on points matched between two different sessions or drives used to sense or gather elevation data for the same road segment or region based on the probability maps of each of the sessions or drives, or other specified weighting factors. FIGS. 7A and 7B are diagrams illustrating an example of a weighted ICP approach for same-level alignment of DEMs. Elevation map 701 depicts a side view of a road surface that represents the ground truth elevation data for a corresponding road segment. Elevation maps 703a and 703b represent the elevation data collected on two drives on the road segment by a data acquisition vehicle equipped with a ground-based LiDAR device. The pixels corresponding to the detected side elevation profile of the road segment are shaded according to their computed probabilities (e.g., lighter shade indicating lower probability that the corresponding elevation matches the ground truth, and darker shade indicating a higher probability).

As shown in FIG. 6B, in one embodiment, to apply a weighted ICP approach to align the two drives 703a and 703b, the DEM integration module 403 matches the pair of points between the two drives 703a and 703b (or any number of candidate drives) for those elevation points that have probabilities above a threshold value. In one embodiment, one or more transformation vectors 721 are then calculated to align the two drives 703a-703b based on the matched pixels with probabilities satisfying the probability threshold value. In one embodiment, the DEM integration module 403 can compute a transformation vector 721 for each pair of matched points between the drives 703a-703b. By way of example, a transformation vector 721 provides transformation parameters to transform the match point from one of the maps 703a-703b to a matched point in the other map. Transformations parameters include, but are not limited to: a shift, rotation, scale, and/or the like. In one embodiment, transformation vectors 721 can be determined for each pair of candidate drives or DEMS or for all candidate drives to a certain reference drive or DEM. The DEM integration module 403 can then apply the transformation vectors 721 to the two drives 703a-703b to generate the fused elevation map 723 to represent the candidate drives using a global coordinate system and/or boundaries.

In addition or as an alternative to same-level alignment, the DEM integration module 403 can perform cross-level DEM alignment 523 between resolution levels of the hierarchical tile-based DEM according to one embodiment. In this way, the DEM integration module 403 can perform a cross-level alignment, a same-level alignment, or a combination thereof among the plurality of different data sources for said each of the plurality of resolution levels to create the hierarchical tile-based DEM representation according to the embodiments described herein. In one embodiment, cross-level DEM alignment aims at aligning DEMs from data sources with different resolutions. In one embodiment, cross-level DEM alignment here can be used for aligning between non-neighbor levels of the hierarchical tile-based DEM. According the example data sources described above, for example, level 16 or below DEM data is determined from USGS or other equivalent elevation data source. In comparison, higher resolution levels such as level 19 are based on HD sources (e.g., ground-based LiDAR point cloud data). Accordingly, in one embodiment, the cross-level DEM alignment process 523 will handle the alignment between n and n+k levels, where k an integer equal to or greater than 1. For aligning neighboring resolutions levels, k can be equal to 1. For aligning between non-neighboring levels, k can be 2 or greater.

In one embodiment, the cross-level alignment process 523 also includes aligning to a global coordinate system. However, there is a distinct challenge of this process—which is, how to reduce the cross-level error. To illustrate, assume that there are two DEMs at level n and n+k, where n ⊂ [0, 17] and k ⊂ [1, 5]. A particular tile at level n contains $2^k$ tiles from n+k level which implies that the shift error will be:

$$\frac{\cos(\text{lattidue} \times \frac{\pi}{180}) \times 2 \times \pi \times 6378137}{256 \times 2^n}$$

This, in turn, equals the ground resolution at level n, if two DEMs are aligned directly.

To address this challenge, the DEM integration module 403 can use a survey point. For example, if a survey point from a third party single point surveying is available, that point can be considered as a ground truth point, and the entire hierarchical tile-based DEM system can then be adjusted to align to this point. In one embodiment, a fine-grained single point survey is aligned with the high-resolution DEMs of the tile-based DEM. In other words, the DEM integration module 403 may not know where to place the single point in the lower resolution (but covering wider area) DEMs. However, in one embodiment, the DEM integration module 403 can then iterate and use the "revised" higher resolution data to further improve the alignment at lower resolution layers of the hierarchical tile-based DEM.

In one embodiment, after generating and aligning the hierarchical tile-based DEM, the DEM compression module 405 can further process the tile-based DEM to improve data compression (e.g., via compression processes 525a-525c) to advantageously reduce memory and disk resource usage, as well as to improve elevation data retrieval speed. For example, as previously discussed, some pixels from the tiles at higher resolution may be empty which, in turn, makes the data sparse particularly at high-resolution levels. Also, in one embodiment, resolution level n is a coarser representation of level n+1 within the hierarchical tile-based DEM.

As an illustration:
The total of urban area coverage in the US is 275,538.47 square kilometers, which is 3.60% of land area according to the US Bureau of the Census. These are the regions which need meter-level resolution of DEM data, because of various modelling purposes in the context of the smart-cities initiative and other similar purposes.
0.61% of the land area in the US is covered by roads of all kinds which need sub-meter-level DEM to support applications such as autonomous driving.

Figure 8:
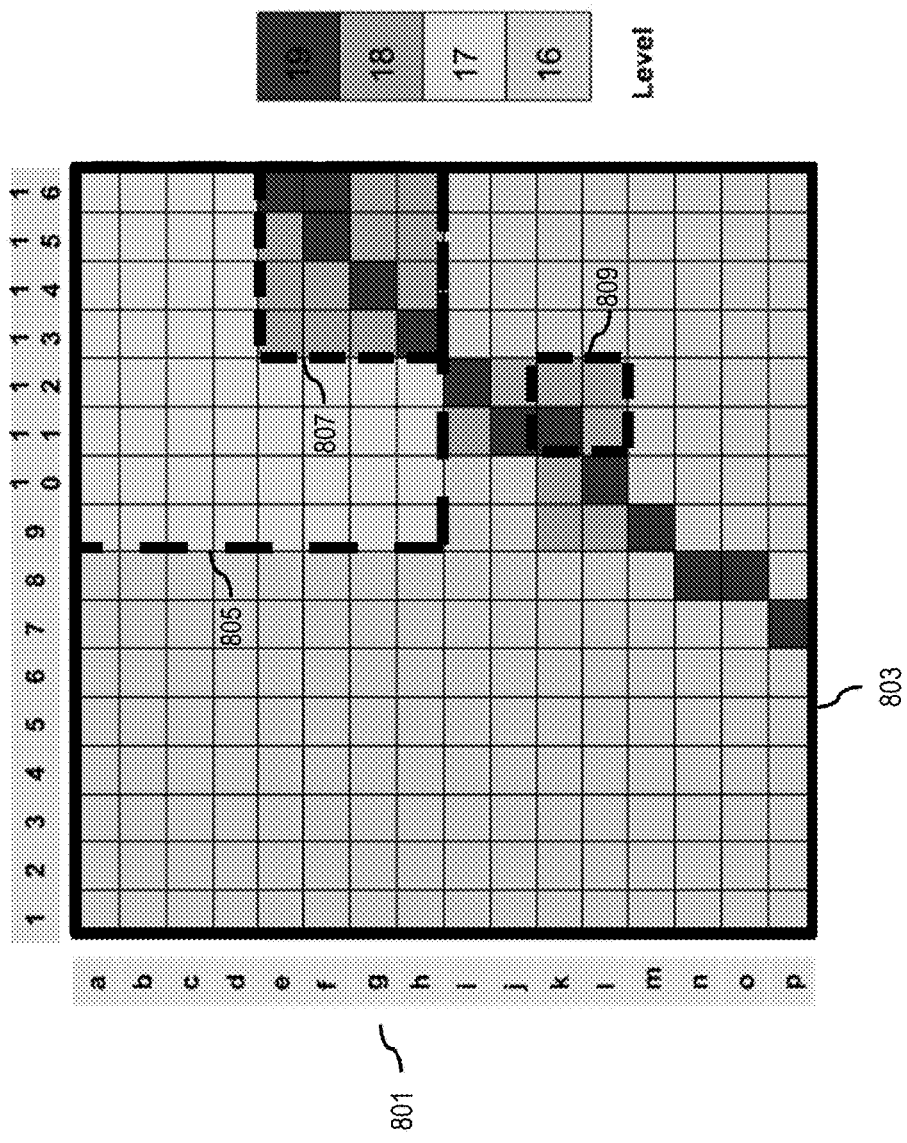
FIG. 8 is a diagram illustrating an example of elevation pixels at different resolution levels, according to one embodiment.

Therefore, high-resolution elevation data (e.g., sub-meter-level data) generally is not needed or available for a large area of the world map. In other words, it means that at level n, some of its sub-tiles at level n+1 may not contain any deeper information. An example of this data sparsity is shown in FIG. 8, which illustrates a DEM 801 in which each pixel of the DEM 801 corresponds to a level 19 resolution. In this example, the darkest shaded pixels indicate pixels with elevation values available at level 19 (e.g., corresponding to a roadway), all other pixels in are empty. In comparison, a pixel size for level 16 is shown by boundary 803, a pixel size for level 17 is shown by boundary 805, a pixel size for level 17 is shown by boundary 807, and a pixel size for level 18 is shown boundary 809.

In one embodiment, based the observation of data sparsity between different levels, the DEM compression module 405 can compress tile-based DEM by, for instance, designating at least one of the of the plurality of resolution levels of the tile-based DEM as a baseline resolution level. The DEM compression module can then fuse the DEM data from the other non-selected resolution levels of the tile-based DEM into the designated resolution level. In this way, all of the DEMs of the hierarchical tile-based DEM is represented with data at only one selected resolution level to reduce storage space requirements and reduce data retrieval time. For example, an HD DEM system 527 (e.g., the DEM platform 101) can respond to an elevation query 529 for elevation data at a specified level by directing the elevation query 527 the designated level to generate the requested elevation data output 531 at the specified level.

For example, the map elevation data of the designated resolution level that is responsive to the elevation query 529 can be compressed to respond to a request for elevation data that specifies a lower resolution level than the designated resolution level. In one embodiment, compressing the data comprises combining the pixels or tiles equivalent to the pixel area of the requested resolution level to return an elevation based on the elevation values of the combined tiles or pixels (e.g., by taking an average, minimum, maximum, median, etc.). Similarly, the map elevation data of the designated resolution level that is responsive to the elevation query 529 can be interpolated to respond to a request for elevation data that specifies a higher resolution level than the designated resolution level. In one embodiment, to avoid over interpolation, the DEM compression module 405 can designate a relatively high-resolution level (e.g., level 17 or above) as the level to which all DEM data from the tile-based DEM will be fused.

Returning to FIG. 1, in one embodiment, the vehicles 103 and UE 105 of system 100 are part of the digital transportation infrastructure provided by the DEM platform 101. In other words, as previously described, the vehicles 103 and/or UE 105 are part of geographical data collection system that transmits or otherwise collects geographical data (e.g., elevation data, incident reports, event reports, etc.) for processing by the DEM platform 101. In one embodiment, the DEM platform 101 has connectivity or access to a geographic database 111 that includes mapping data (e.g., including elevation data at different resolutions) about a road network, including a tile projection of the mapping or elevation data (additional description of the geographic database 111 is provided below with respect to FIG. 9). In one embodiment, the hierarchical resolution tile-based DEM representation generated according to the various embodiments described herein can also be stored in the geographic database 111 by the DEM platform 101 for distribution to end users. In addition or alternatively, the hierarchical tile-based DEM and/or related information can be stored by another component of the system 100 in the geographic database 111 for subsequent retrieval and processing by the DEM platform 101.

In one embodiment, the vehicles 103 and/or UEs 105 may execute a software application 113 to query, present, or use the hierarchical tile-based DEM generated by the DEM platform 101. For example, if the application 113 is a navigation application then the DEM platform 101 can transmit or publish tile-based elevation data to the application 113 in real time to provide better situational awareness when traveling in a road network. In one embodiment, the vehicles 103 receiving the tile-based DEM data can be autonomous or highly assisted driving vehicles which can use the elevation data for calculating autonomous driving behavior or control of the vehicles 103. For example, the tile-based DEM data can be used to determine routing information, provide notifications of potentially problematic areas, and/or the like.

By way of example, the UE 105 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 105 can support any type of interface to the user (such as "wearable" circuitry, etc.). In one embodiment, the UE 105 may be associated with a vehicle 103 (e.g., cars), a component part of the vehicle 103, a mobile device (e.g., phone), and/or a combination of thereof. Similarly, the vehicle 103 may include computing components that can be perform all or a portion of the functions of the UE 105.

By way of example, the application 113 may be any type of application that is executable at the vehicle 103 and/or the UE 105, such as vehicle control application, mapping application, location-based service applications, navigation applications, content provisioning services, camera/imaging application, media player applications, social networking applications, calendar applications, and the like. In one embodiment, the application 113 may act as a client for the DEM platform 101 and perform one or more functions of the DEM platform 101 alone or in combination with the DEM platform 101.

In one embodiment, the vehicles 103 and/or the UEs 105 are configured with various sensors for generating or collecting the geographical data (e.g., including elevation data).

By way of example, the sensors may include, but is not limited to, ground-based LiDAR, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the vehicles 103 and/or UE 105 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors may detect weather data, traffic information, or a combination thereof. In one example embodiment, the vehicles 103 and/or UE 105 may include GPS receivers to obtain geographic coordinates from satellites 115 for determining current location and time associated with the vehicle 103 and/or UE 105 for generating probe data. Further, the location can be determined by a triangulation system such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the DEM platform 101 may be a platform with multiple interconnected components. The DEM platform 101 may include multiple servers, intelligent networking devices, computing devices, components and corresponding software for providing trajectory bundles for map data analysis. In addition, it is noted that the DEM platform 101 may be a separate entity of the system 100, a part of the one or more services 117*a*-117*m* (collectively referred to as services 117) of the services platform 119, or included within the vehicle 103 and/or the UE 105.

The services platform 119 may include any type of service 117 configured to process or use tile-based DEM data provided by the DEM platform 101. By way of example, the services 117 may be third party services and include autonomous vehicle services, mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 119 may interact with the DEM platform 101, vehicles 103, and/or UE 105 to provide the services 117.

In one embodiment, content providers 121*a*-121*k* (collectively referred to as content providers 121) may provide content or data (e.g., including geographical data) to the vehicles 103 and/or UE 105, the DEM platform 101, and/or the services 117. The content provided may be any type of content, such as textual content, audio content, video content, image content, etc. In one embodiment, the content providers 121 may provide content that may aid in the detecting and classifying of traffic incidents and/or other location-based events indicated the geographical data received by the DEM platform 101. In one embodiment, the content providers 121 may also store content associated with the vehicles 103, the UE 105, the DEM platform 101, and/or the services 117. In another embodiment, the content providers 121 may manage access to a central repository of data, and offer a consistent, standard interface to data, such as a repository of elevation data, tile-based DEM data, probe data, etc. Any known or still developing methods, techniques or processes for retrieving and/or accessing features for road links from one or more sources may be employed by the DEM platform 101.

By way of example, the DEM platform 101, vehicles 103, UE 105, the services platform 119, and the content providers 121 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
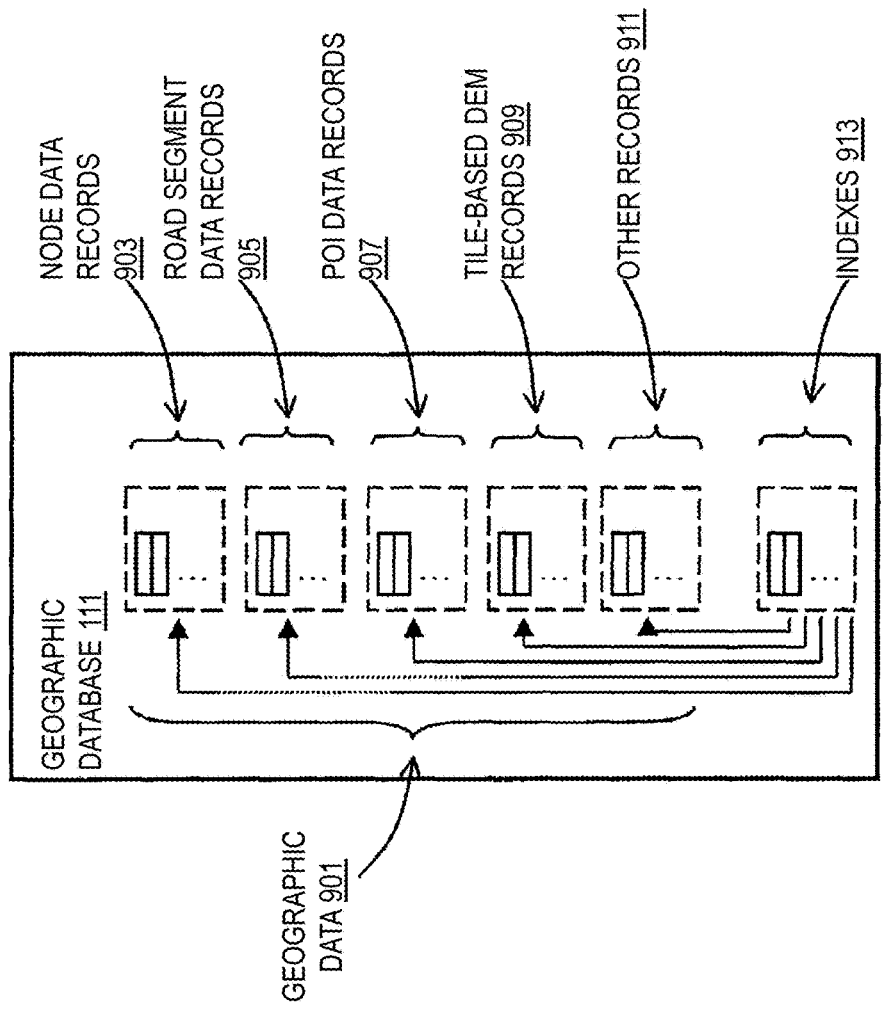
FIG. 9 is a diagram of a geographic database, according to one embodiment.

FIG. 9 is a diagram of the geographic database 111 of system 100, according to exemplary embodiments. In the exemplary embodiments, clustered geographical data can be stored, associated with, and/or linked to the geographic database 111 or data thereof. In one embodiment, the geographic database 111 includes geographic data 901 used for (or configured to be compiled to be used for) mapping and/or navigation-related services, such as for personalized route determination, according to exemplary embodiments. For example, the geographic database 111 includes node data records 903, road segment or link data records 905, POI data records 907, tile-based DEM records 909, other records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 111. The indexes 913 may be used to quickly locate data without having to search every row in the geographic database 111 every time it is accessed.

In exemplary embodiments, the road segment data records 905 are links or segments representing roads, streets, or paths, as can be used in the calculated route or recorded route information for determination of one or more personalized routes, according to exemplary embodiments. The node data records 903 are end points corresponding to the respective links or segments of the road segment data records 905. The road link data records 905 and the node data records 903 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 907. The geographic database 111 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 111 is presented according to a hierarchical or multi-level tile projection. Information related to this tile projection (e.g., hierarchical tile-based DEM data) is stored in the tile-based DEM records 909. More specifically, in one embodiment, the geographic database 111 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

In one embodiment, the tile-based DEM records 909 also store the hierarchical tile-based DEM generated according to the various embodiments described herein. In one embodiment, the DEM platform 101 provides the tile-based data records 909 to support real-time or substantially real-time distribution of the hierarchical tile-based DEM data (e.g., for autonomous vehicle operation). In one embodiment, real-time or substantially real-time refers to generating an output (e.g., a distribution of the tile-based DEM data) within a predetermined period of time from receiving an input (e.g., an elevation query). This predetermined period can be configured from milliseconds to seconds to minutes or more of the data collection depending on how the system 100 is configured to indicate a real-time or substantially real-time scale.

In one embodiment, the geographic database 111 can be maintained by the content provider 121 in association with the services platform 119 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as autonomous vehicle operation, route calculation, route guidance, map display, speed calculation, distance and travel time functions, and other functions, by a navigation device, such as by a vehicle 103 or UE 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., vehicle 103, UE 105, etc.) to provide navigation-related functions. For example, the geographic database 111 can be used with the end user device to provide an end user with navigation features. In such a case, the geographic database 111 can be downloaded or stored on the end user device (e.g., vehicle 103, UE 105, etc.), such as in application 113, or the end user device can access the geographic database 111 through a wireless or wired connection (such as via a server and/or the communication network 107), for example.

In one embodiment, the end user device can be an in-vehicle navigation system, an autonomous vehicle control system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 105) can be a cellular telephone. An end user can use the device navigation functions such as guidance and map display, for example, and for determination of route information to at least one identified point of interest, according to exemplary embodiments.

The processes described herein for providing a hierarchical tile-based DEM may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
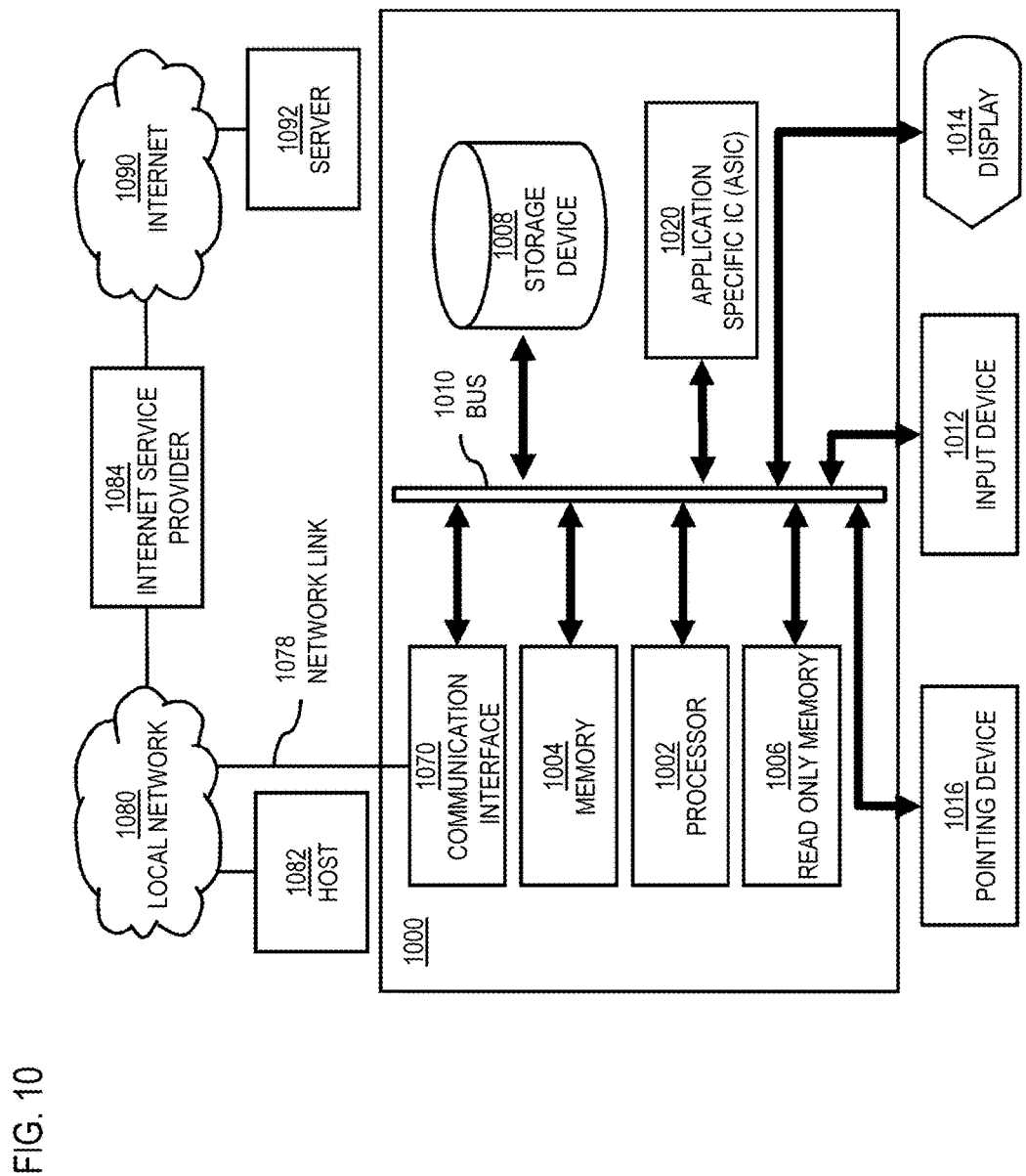
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to provide a hierarchical tile-based DEM as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing a hierarchical tile-based DEM. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing a hierarchical tile-based DEM. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing a hierarchical tile-based DEM, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general, the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for providing a hierarchical tile-based DEM.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to provide a hierarchical tile-based DEM as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide a hierarchical tile-based DEM. The memory 1105 also stores the data associated with or generated by the execution of the inventive steps.

Figure 12:
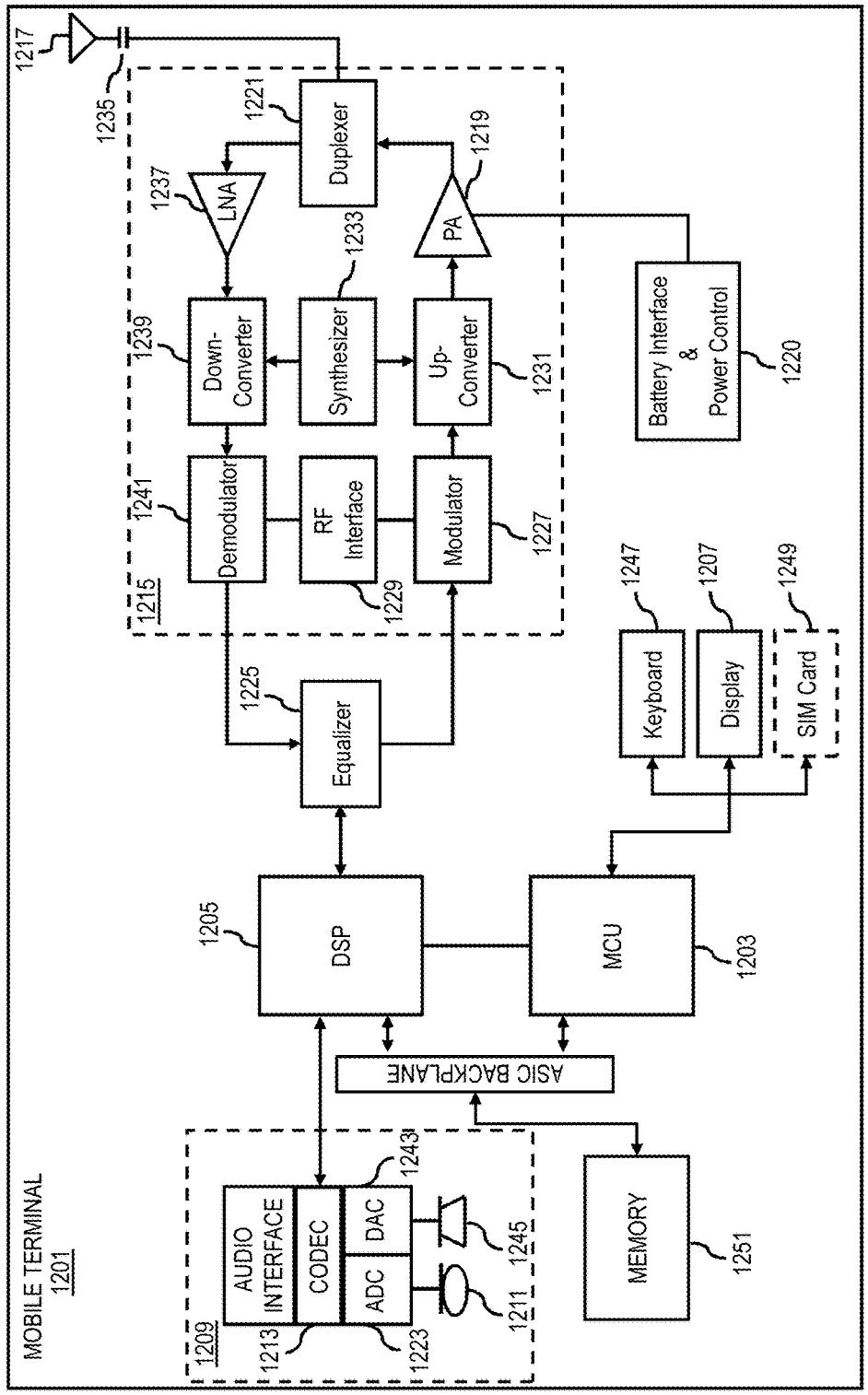
FIG. 12 is a diagram of a mobile terminal (e.g., handset) that can be used to implement an embodiment of the invention.

FIG. 12 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide a hierarchical tile-based DEM. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing a digital elevation model comprising:
    processing, by a processor, map elevation data to create a hierarchical resolution tile representation of the digital elevation model for a geographic area,
    wherein the hierarchical resolution tile representation includes a plurality of resolution levels, each of the plurality of levels representing the digital elevation model at a different resolution,
    wherein the digital elevation model includes a plurality of control points, each of the plurality of control points being associated with an elevation data point determined from the map elevation data;
    for a tile at one level of the plurality of resolution levels, creating a local digital elevation model by projecting the map elevation data for the tile to a tangent plane comprising a plurality of elevation data points;
    computing a probability map for the plurality of elevation data points, the probability map indicating respective probability data that each of the plurality of elevation data points is associated with a corresponding elevation value; and
    creating a new local digital elevation model based on the probability map.

2. The method of claim 1, further comprising:
    updating the probability map based on the new local digital elevation model.

3. The method of claim 1, wherein at least one of the plurality of the resolution levels is based on a high definition digital elevation model determined from point cloud data.

4. The method of claim 1, further comprising:
    designating at least one of the of the plurality of resolution levels as a baseline resolution level,
    wherein the map elevation data from the designated at least one resolution level is compressed to respond to a request for elevation data at a lower resolution level; and
    wherein the map elevation data from the designated at least one resolution level is interpolated to respond to another request for elevation data at a higher resolution level.

5. The method of claim 1, further comprising:
retrieving the map elevation data from one or more non-point-cloud sources for the plurality of resolution levels that are below a resolution threshold; and
retrieving the map elevation data from one or more point-cloud sources for the plurality of resolution levels that are above a resolution threshold.

6. The method of claim 1, further comprising:
interpolating one or more of the plurality of elevation data points using the probability map to create the new local digital elevation model.

7. The method of claim 6, further comprising:
identifying a first set of the plurality of elevation data points for which the respective probability data is above a threshold value; and
identifying a second set of the plurality of elevation data points for which there is no corresponding elevation value,
wherein the new local digital elevation model is created by interpolating the map elevation data from the first set to the second set.

8. An apparatus for providing a digital elevation model comprising:
at least one processor; and
at least one memory including computer program code for one or more programs,
the at least one memory and the computer program code configured to, with the at least one processor, cause the apparatus to perform at least the following,
process map elevation data to create a hierarchical resolution tile representation of the digital elevation model for a geographic area,
wherein the hierarchical resolution tile representation includes a plurality of resolution levels, each of the plurality of levels representing the digital elevation model at a different resolution,
wherein the digital elevation model includes a plurality of control points, each of the plurality of control points being associated with an elevation data point determined from the map elevation data;
for a tile at one level of the plurality of resolution levels, create a local digital elevation model by projecting the map elevation data for the tile to a tangent plane comprising a plurality of elevation data points;
compute a probability map for the plurality of elevation data points, the probability map indicating respective probability data that each of the plurality of elevation data points is associated with a corresponding elevation value; and
create a new local digital elevation model based on the probability map.

9. The apparatus of claim 8, wherein the map elevation data for said each of the plurality of resolution levels is retrieved from a plurality of different data sources, and wherein the apparatus is further caused to:
perform a cross-level alignment, a same-level alignment, or a combination thereof among the plurality of different data sources for said each of the plurality of resolution levels,
wherein the creation of the hierarchical resolution tile representation is further based on the cross-level alignment, the same-level alignment, or a combination thereof.

10. The apparatus of claim 8, wherein the apparatus is further caused to:
designate at least one of the plurality of resolution levels as a baseline resolution level,
wherein the map elevation data from the designated at least one resolution level is compressed to respond to a request for elevation data at a lower resolution level; and
wherein the map elevation data from the designated at least one resolution level is interpolated to respond to another request for elevation data at a higher resolution level.

11. The apparatus of claim 8, wherein the apparatus is further caused to:
interpolate one or more of the plurality of elevation data points using the probability map to create the new local digital elevation model.

12. The apparatus of claim 11, wherein the apparatus is further caused to:
identify a first set of the plurality of elevation data points for which the respective probability data is above a threshold value; and
identify a second set of the plurality of elevation data points for which there is no corresponding elevation value,
wherein the new local digital elevation model is created by interpolating the map elevation data from the first set to the second set.

13. A non-transitory computer-readable storage medium for providing a digital elevation model, and carrying one or more sequences of one or more instructions which, when executed by one or more processors, cause an apparatus to perform:
processing map elevation data to create a hierarchical resolution tile representation of the digital elevation model for a geographic area,
wherein the hierarchical resolution tile representation includes a plurality of resolution levels, each of the plurality of levels representing the digital elevation model at a different resolution,
wherein the digital elevation model includes a plurality of control points, each of the plurality of control points being associated with an elevation data point determined from the map elevation data;
for a tile at one level of the plurality of resolution levels, creating a local digital elevation model by projecting the map elevation data for the tile to a tangent plane comprising a plurality of elevation data points;
computing a probability map for the plurality of elevation data points, the probability map indicating respective probability data that each of the plurality of elevation data points is associated with a corresponding elevation value; and
creating a new local digital elevation model based on the probability map.

14. The non-transitory computer-readable storage medium of claim 13, wherein the apparatus is caused to further perform:
identifying a first set of the plurality of elevation data points for which respective probability data is above a threshold value; and
identifying a second set of the plurality of elevation data points for which there is no corresponding elevation value,
wherein the new local digital elevation model is created by interpolating the map elevation data from the first set to the second set.

15. The non-transitory computer-readable storage medium of claim 13, wherein the map elevation data for said each of the plurality of resolution levels is retrieved from a plurality of different data sources, and wherein the apparatus is caused to further perform:

performing a cross-level alignment, a same-level alignment, or a combination thereof among the plurality of different data sources for said each of the plurality of resolution levels, wherein the creation of the hierarchical resolution tile representation is further based on the cross-level alignment, the same-level alignment, or a combination thereof.

16. The non-transitory computer-readable storage medium of claim 13, wherein the apparatus is caused to further perform:

designating at least one of the plurality of resolution levels as a baseline resolution level, wherein the map elevation data from the designated at least one resolution level is compressed to respond to a request for elevation data at a lower resolution level; and wherein the map elevation data from the designated at least one resolution level is interpolated to respond to another request for elevation data at a higher resolution level.

17. A method for providing a digital elevation model comprising:

processing, by a processor, map elevation data to create a hierarchical resolution tile representation of the digital elevation model for a geographic area, wherein the hierarchical resolution tile representation includes a plurality of resolution levels, each of the plurality of levels representing the digital elevation model at a different resolution;

wherein the digital elevation model includes a plurality of control points, each of the plurality of control points being associated with an elevation data point determined from the map elevation data, wherein the map elevation data for said each of the plurality of resolution levels is retrieved from a plurality of different data sources; and performing a cross-level alignment, a same-level alignment, or a combination thereof among the plurality of different data sources for said each of the plurality of resolution levels, wherein the creation of the hierarchical resolution tile representation is further based on the cross-level alignment, the same-level alignment, or a combination thereof, wherein the cross-level alignment is performed between two non-neighboring resolution levels of the plurality of resolutions levels.

18. The method of claim 17, wherein the same-level alignment is based on a weighted iterative closest point matching between two elevation data observations occurring at a same one of the plurality of resolution levels.

* * * * *